United States Patent
Packer et al.

[11] Patent Number: 6,106,585
[45] Date of Patent: Aug. 22, 2000

[54] PROCESS FOR MAKING DIAMOND AND CUBIC BORON NITRIDE CUTTING ELEMENTS

[75] Inventors: Scott M. Packer, Pleasant Grove; Ronald B. Crockett, Orem, both of Utah; Arturo A. Rodriguez, West Bloomfield, Mich.

[73] Assignee: Smith International, Inc., Houston, Tex.

[21] Appl. No.: 08/601,630

[22] Filed: Feb. 14, 1996

[51] Int. Cl.$^7$ ........................................................ B24D 3/04
[52] U.S. Cl. ........................ 51/309; 51/307; 264/430; 264/642; 264/678; 407/114; 407/115
[58] Field of Search ............... 264/430, 60, 642, 264/678; 51/309, 307; 407/114, 115

[56] References Cited

U.S. PATENT DOCUMENTS

| | | | |
|---|---|---|---|
| 3,743,489 | 7/1973 | Wentorf | 51/307 |
| 3,745,623 | 7/1973 | Wentorf | 51/307 |
| 4,525,179 | 6/1985 | Gigl | 51/309 |
| 4,629,373 | 12/1986 | Hall | 51/309 |
| 4,861,350 | 8/1989 | Phaal et al. | 51/307 |
| 4,993,893 | 2/1991 | Niebauer | 407/114 |
| 5,026,960 | 6/1991 | Slutz | 219/69.17 |
| 5,037,451 | 8/1991 | Burnand et al. | 51/293 |
| 5,054,246 | 10/1991 | Phaal | 51/309 |
| 5,057,124 | 10/1991 | Cerceau | 51/293 |
| 5,082,401 | 1/1992 | Niebauer | 407/114 |

*Primary Examiner*—James Derrington
*Attorney, Agent, or Firm*—Robert M. Vargo

[57] ABSTRACT

A high pressure/high temperature process is disclosed for making polycrystalline diamond or CBN compacts having chip control surfaces formed thereon. Making these chip control surfaces is accomplished by pre-forming the indentations or raised dimples within the can used in the HP/HT process.

20 Claims, 2 Drawing Sheets

PROCESS FOR MAKING DIAMOND AND CUBIC BORON NITRIDE CUTTING ELEMENTS

BACKGROUND OF THE INVENTION

1. Field of the Invention

This invention relates generally to the high pressure/high temperature (BP/HT) process for making polycrystalline diamond and cubic boron nitride cutting elements. More particularly, the invention relates to certain modifications in the HP/HT process which can result in increased efficiency in the production of small cutting elements having improved characteristics.

2. Description of the Prior Art

A cutting element of the type described is a polycrystalline mass of abrasive particles (e.g. diamond and cubic boron nitride) bonded together to form an integral, tough, coherent, high-strength mass. This mass is bonded to a substrate material, such as cemented metal carbide generally selected from the group consisting of tungsten carbide, titanium carbide, tantalum carbide and mixtures thereof with metal bonding material generally selected from the group consisting of cobalt, nickel, iron and mixtures thereof.

Cutting elements of the type described may be used as blanks for cutting tools, drill bits, dressing tools and wear parts.

The method for manufacturing such cutting elements has been described in U.S. Pat. Nos. 3,745,623, 3,743,489 and 4,525,179 and such descriptions are incorporated herein by reference.

U.S. Pat. No. 4,525,179 also describes a method for producing a plurality of cutting elements from a single pressed mass by placing partitions within the crystal mass before BP/HT processing. These partitions are later removed by acid leaching to obtain the plurality of small cutting elements.

It has also been the practice in the industry to wire cut the pressed mass to separate the mass into a plurality of small cutting elements. However, the mass itself and the resulting cutting elements were simple shapes having flat diamond surfaces.

SUMMARY OF THE INVENTION

The present invention relates to a process for making a plurality of cutting elements from a single pressed mass and modifications are provided to enable the cutting elements to have complex shapes with complex diamond surfaces.

One application for such elements is in cutting tools in which the cutting element has a chip breaker formed on the diamond face.

The above noted objects and advantages of the present invention will be more fully understood upon a study of the following description in conjunction with the detailed drawings.

DESCRIPTION OF THE PREFERRED EMBODIMENTS AND BEST MODE FOR CARRYING OUT THE INVENTION

Figure 1:
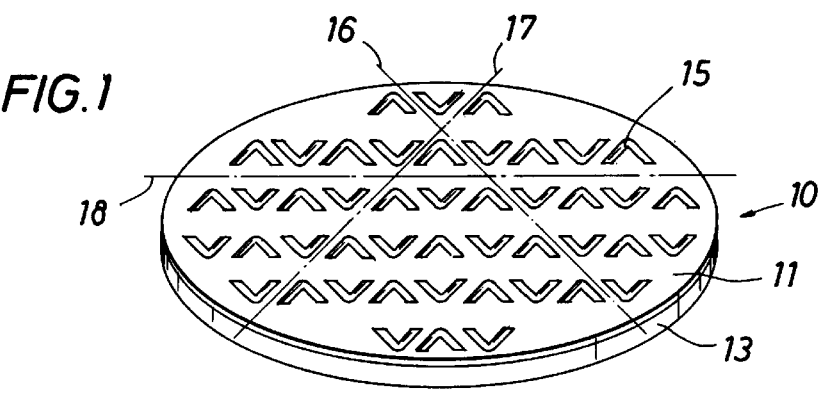
FIG. 1 is a perspective view of a composite mass of polycrystalline material bonded to a metal carbide substrate made in accordance to the present invention.

FIG. 1 illustrates a composite mass 10 having a layer 11 of polycrystalline material bonded to a metal carbide substrate 13. The layer 11 has a plurality of "vee" grooves 15 formed therein during the BP/HT process.

The composite mass 10 is formed by placing a mass of abrasive crystals, either diamond or CBN, and a mass of catalyst metal in contact with the abrasive crystals into a cell or can which is a protective shield metal enclosure. The remaining volume of the can not filled with the material, mentioned above, is filled with a quantity of substrate material.

In accordance with the present invention, the top surface of the inside of the can is pre-formed with dimples. This dimpled surface functions as the pattern or die for the top surface of the layer 11.

Figure 2:
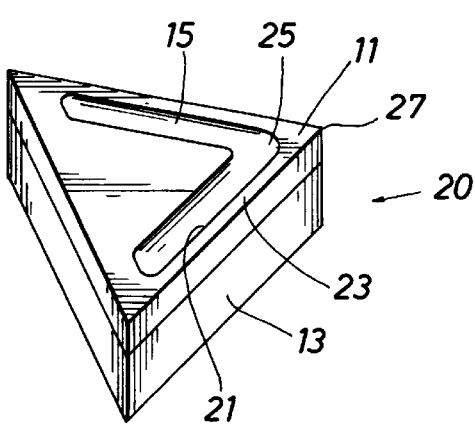
FIG. 2 is a perspective view of a single cutting element cut from the composite mass.

The can with its contents are subjected to conditions of temperature, pressure and time sufficient to give intercrystal bonding between adjacent crystal grains. After the HP/HT process, the mass 10 is EDM wire cut along lines in three directions, as exemplified by lines 16, 17 and 18 to produce a plurality of triangular cutting elements 20 (see FIG. 2). It is noted that the cuts are made in such a manner to enable one vee groove 15 to be strategically placed on one cutting element such that the length of each groove 21 is positioned adjacent one edge 23 of the triangle with the juncture 25 of the grooves located near corner 27 of the cutting element 20.

When functioning as a cutting tool, the groove 15 would then function as a chip breaker for controlling the size of the cuttings created by the cutting operation. It should also be noted that shapes other than a vee shape can be utilized informing the chip breaker. All that would be required would be to pre-form the desired shape onto the top inner surface of the can.

The location of the vee groove 15 on the cutting element 20 can also be varied to account for variabilities such as rotary speed feed rate, and hardness the workpiece.

Figure 3:
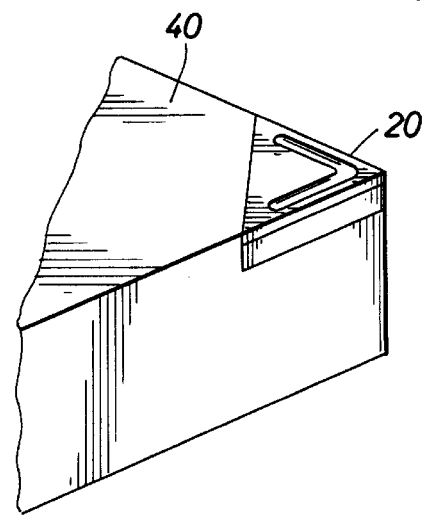
FIG. 3 is a partial perspective view of the cutting element bonded to a carrier body.

FIG. 3 illustrates the cutting element 20 being brazed within a pocket formed on a carrier 40. This carrier 40 is preferably made of metal carbide and is adapted to be mounted on a cutting machine such as a lathe, The carrier 40 can also be adapted to have a plurality of cutting elements 20 brazed onto the corners of the carrier 40, in order to be used in an indexable manner.

It should also be noted that with the vee grooves 15 being indented, standard EDG and other lapping procedures can be utilized on the flat diamond or diamond-like surface.

Finally, although the cutting element 20 is preferred to be brazed to a holder or carrier 40, the cutting element could also be adapted to be connected directly to the cutting machine. This can be accomplished by forming a hole in the center of the cutting element 20 for such a connection.

Figure 4:
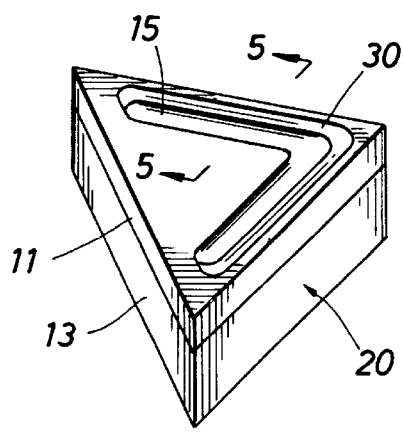
FIG. 4 is a perspective view of a cutting element having a positive rake slope formed adjacent the cutting edges.
Figure 5:
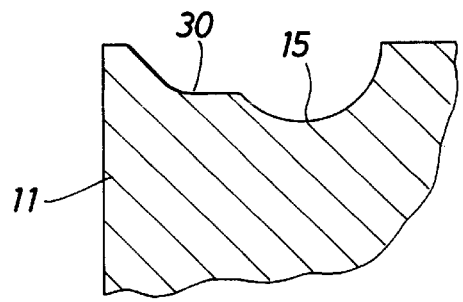
FIG. 5 is a partial sectional view of the cutting edge of the element.

As more clearly illustrated in FIGS. 4 and 5, the surface of the mass 10 and the resultant triangular cutting elements 20 can have indentations 30 formed thereon adjacent the vee grooves 15. These indentations 30 form a downward slope along the edges of the cutting elements 20 in order to allow the cutting elements 20 to have a positive rake with respect to the workpiece it is cutting. A positive rake of 5° to 7° is preferred.

Figure 6:
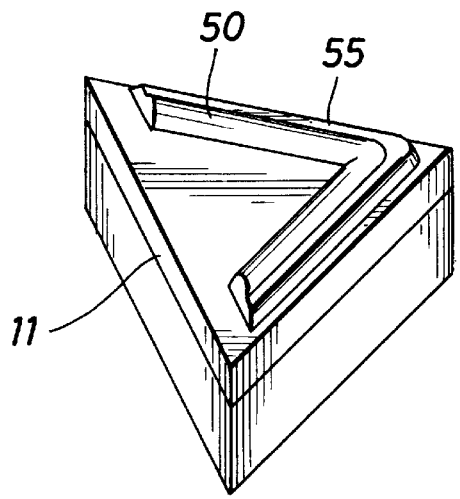
FIG. 6 is a perspective view of the second embodiment of the cutting element.
Figure 7:
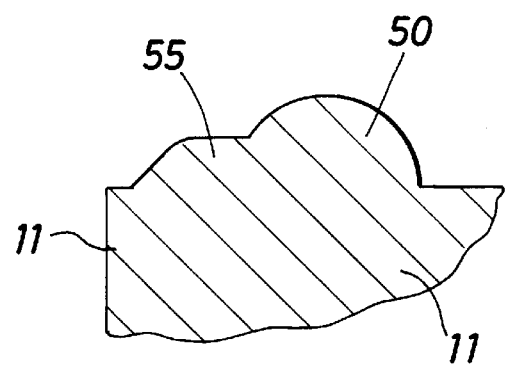
FIG. 7 is a partial sectional view of the cutting element of the second embodiment having a negative rake slope coupled with a protruding chip breaker both extending above the surface of the cutting element.

It should be noted that the vee shaped structure could also extend above the surface of the layer 11, as shown at 50 in FIGS. 5, 6 and 7. This can be accomplished by pre-forming a plurality of indents (mirror images) on the lower can surface rather than raised portions. These vee shaped projections 50 would also function as chip breakers.

FIGS. 6 and 7 also show a raised edge 55 which would extend along the cutting edge of the cutting element 20. This raised edge 55 functions as a negative rake for the cutting tool. Again this entire construction can be made by having mirror images of the negative rake and vee shaped projections formed on the can surface.

Figure 8:
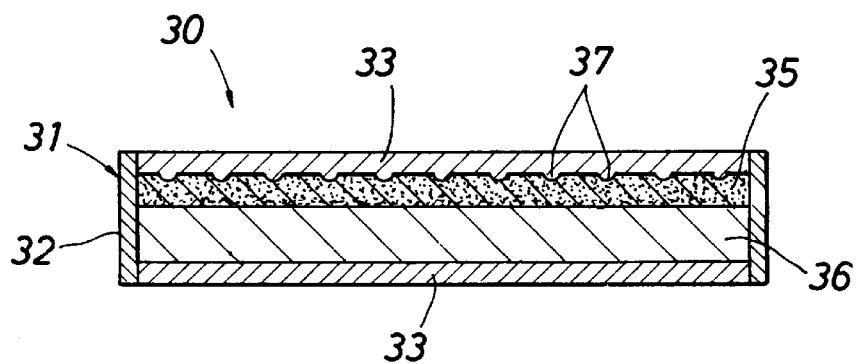
FIG. 8 is a sectional view of the HP/HT reaction cell as modified by the present invention.

FIG. 8 illustrates the charge assembly 30 utilized in the BP/HT process for the first embodiment. Operational techniques for simultaneously applying both high pressures and high temperatures in this type of apparatus are well known to those skilled in the art. Referring now to FIG. 8, the charge assembly 30 fits within the space defined by the salt liner and plugs. The assembly consists of a can 31 comprising a cylindrical sleeve 32 and caps 33 of shield metal selected from a group consisting of zirconium, titanium, tantalum tungsten and molybdenum.

A mass of abrasive crystals 34 (diamond, CBN or mixtures thereof) is disposed within the cavity of the can 31.

A mass of sintered metal bonded carbide (e.g. titanium, tungsten or tantalum carbide) or carbide powder with appropriate metal bonding medium (e.g. cobalt, iron or nickel) would also be placed within the assembly. In FIG. 8, this would appear as a layer 36 underneath the abrasive crystal mass 34. The manufacture of composite compacts is well known and more details may be found in U.S. Pat. No. 3,745,623.

In accordance with the present invention, the top cap 33 also includes a plurality of projections 7 extending downwardly from its inside surface, these projections are the mirror image of the vee grooves formed on the diamond surface of the compact.

The charge assembly is loaded in a reaction vessel which is placed in the HP/HT apparatus (either a belt or cubic press). The pressure and temperature are increased for sufficient time for sintering to occur. The sample is then allowed to cool under pressure for a short period of time and after the pressure is reduced to atmospheric, the compact, as shown in FIG. 1, is recovered.

It will of course be realized that various modifications can be made in the design and operation of the present invention without departing from the spirit thereof. Thus while the principal preferred construction and mode of operation of the invention have been explained in what is now considered to represent its best embodiments which have been illustrated and described, it should be understood that within the scope of the appended claims the invention may be practiced otherwise than as specifically illustrated and described.

What is claimed is:

1. A process for preparing a compact mass comprising:
   providing a mass of abrasive crystals selected from the group consisting of polycrystalline diamond, cubic boron nitride and mixtures containing polycrystalline diamond or CBN, which mass is in contact with a mass of carbide crystals containing a cementing agent;
   pre-forming a plurality of indentations on the surface of the abrasive crystals;
   subjecting the mass of abrasive crystals to conditions of temperature, pressure and time which result in a compact;
   recovering the compact mass; and
   cutting the compact mass into a plurality of cutting elements, each having an indentation strategically located thereon to form a chip control surface.

2. The invention of claim 1 wherein the cutting step comprises the step of cutting with an EDM wire cutter.

3. The invention of claim 1 wherein the indentations are formed by providing a can enclosure for receiving the mass of abrasive crystals and metal carbide, the end of the can contacting the abrasive crystals having a dimpled surface which forms the die or mold for the indentations on the surface of the bonded abrasive crystals.

4. The invention of claim 1 wherein the cutting elements are cut into a plurality of triangular pieces.

5. The invention of claim 4 wherein each chip control indentation is formed into a vee shaped groove with the apex or corner of the vee being located adjacent a corner of the triangular cutting element, with the extensions therefrom running along two edges of the element.

6. A process for preparing a compact mass comprising:
   providing a mass of abrasive crystals selected from the group consisting of polycrystalline diamond, cubic boron nitride and mixtures thereof;
   pre-forming a plurality of indentations on the surface of the abrasive crystals;
   subjecting the mass of abrasive crystals to conditions of temperature, pressure and time which result in a compact;
   recovering the compact mass; and
   cutting the compact mass into a plurality of cutting elements, each having an indentation strategically located thereon to form a chip control surface.

7. The invention of claim 6 wherein the cutting step comprises the step of cutting with an EDM wire cutter.

8. The invention of claim 6 wherein the indentations are formed by providing a can enclosure for receiving the mass of abrasive crystals and metal carbide, the end of the can contacting the abrasive crystals having a dimpled surface which forms the die or mold for the indentations on the surface of the bonded abrasive crystals.

9. The invention of claim 6 wherein the cutting elements are cut into a plurality of triangular pieces.

10. The invention of claim 9 wherein each chip control indentation is formed into a vee shaped groove with the apex or corner of the vee being located adjacent a corner of the triangular cutting element, with the extensions therefrom running along two edges of the element.

11. A process for preparing a compact mass comprising:
   providing a mass of abrasive crystals selected from the group consisting of polycrystalline diamond, cubic boron nitride and mixtures containing polycrystalline diamond CBN thereof,;
   pre-forming a plurality of raised dimples on the surface of the abrasive crystals;
   subjecting the mass of abrasive crystals to conditions of temperature, pressure and time which result in a compact;

recovering the compact mass; and cutting the compact mass into a plurality of triangular cutting elements, each having a raised dimple strategically located thereon to form a chip control surface.

12. The invention of claim 11 wherein the cutting step comprises the step of cutting with an EDM wire cutter.

13. The invention of claim 11 wherein the raised dimples are formed by providing a can enclosure for receiving the mass of abrasive crystals, the end of the can contacting the abrasive crystals having a surface with indentations which form the die or mold for the raised dimples on the surface of the bonded abrasive crystals.

14. The invention of claim 11 wherein each chip control raised dimple is formed into a vee shaped projection above the surface of the triangular piece with the apex or corner of the vee being located adjacent a corner of the triangular cutting element, with the extensions therefrom running along the two edges of the element.

15. The invention of claim 6 or 10 further comprising the step of forming an angled surface along the edges of each cutting element to create a rake angle on the edges.

16. The invention of claim 15 wherein the angled surfaces are formed by a can having a mirror image to the angled surfaces formed on the end contacting the abrasive crystals.

17. The invention of claim 16 wherein the angled surface along the edges of each cutting element is angled below the surface of the cutting element to create a positive rake angle.

18. The invention of claim 16 wherein the rake angle is between 2° to 20°.

19. The invention of claim 16 wherein the angled surface along the edges of each cutting element is angled above the surface of the cutting element to create a negative rake angle.

20. The invention of claim 19 wherein the rake angle is between 2° to 20°.

* * * * *